(12) United States Patent
Andersen et al.

(10) Patent No.: US 11,288,488 B2
(45) Date of Patent: Mar. 29, 2022

(54) METHOD OF A FINGERPRINT SENSING SYSTEM OF ENABLING AUTHENTICATION OF A USER BASED ON FINGERPRINT DATA

(71) Applicant: FINGERPRINT CARDS AB, Gothenburg (SE)

(72) Inventors: Klaus S. Andersen, Hvidovre (DK); Morten Hansen, Hellerup (DK)

(73) Assignee: FINGERPRINT CARDS ANACATUM IP AB, Gothenburg (SE)

(*) Notice: Subject to any disclaimer, the term of this patent is extended or adjusted under 35 U.S.C. 154(b) by 0 days.

(21) Appl. No.: 16/623,203

(22) PCT Filed: Jun. 27, 2018

(86) PCT No.: PCT/SE2018/050697
§ 371 (c)(1),
(2) Date: Dec. 16, 2019

(87) PCT Pub. No.: WO2019/009788
PCT Pub. Date: Jan. 10, 2019

(65) Prior Publication Data
US 2021/0142036 A1 May 13, 2021

(30) Foreign Application Priority Data
Jul. 7, 2017 (SE) .................................. 1750897-9

(51) Int. Cl.
*G06K 9/00* (2006.01)
*G06F 21/32* (2013.01)

(52) U.S. Cl.
CPC ......... *G06K 9/00087* (2013.01); *G06F 21/32* (2013.01); *G06K 9/00013* (2013.01); *G06K 9/00067* (2013.01)

(58) Field of Classification Search
CPC .......... G06K 9/00087; G06K 9/00067; G06K 9/00013; G06F 21/32
See application file for complete search history.

(56) References Cited

U.S. PATENT DOCUMENTS 6,535,622 B1 * 3/2003 Russo ................ G06K 9/00013
340/5.83
2001/0040987 A1 * 11/2001 Bjorn .................... G07F 7/1008
382/124

(Continued)

FOREIGN PATENT DOCUMENTS

CN 106164933 A 11/2016
EP 1936576 A1 6/2008

(Continued)

OTHER PUBLICATIONS

PCT International Search Report and Written Opinion dated Sep. 25, 2018 for International Application No. PCT/SE2018/050697, 8 pages.

(Continued)

*Primary Examiner* — Bobbak Safaipour
*Assistant Examiner* — Wassim Mahrouka
(74) *Attorney, Agent, or Firm* — RMCK Law Group, PLC (57) ABSTRACT

The invention relates to a fingerprint sensing system and a method of the fingerprint sensing system of enabling authentication of a user based on fingerprint data captured by a fingerprint sensor of the fingerprint sensing system. The method comprises capturing at least one image of a fingerprint of a user's finger contacting the fingerprint sensor, acquiring a stored image comprising impairment data caused by impairments that the fingerprint sensor is subjected to, extracting fingerprint feature data from the captured at least one image, extracting impairment feature data from the acquired image, and comparing at least a subset of the (Continued)

extracted fingerprint feature data to at least a subset of the extracted impairment feature data of the acquired image, and if there is a match the user is not authenticated.

16 Claims, 10 Drawing Sheets

(56) References Cited

U.S. PATENT DOCUMENTS

| | | | |
|---|---|---|---|
| 2007/0047783 A1 | 3/2007 | Kim et al. | |
| 2015/0022670 A1 | 1/2015 | Gozzini et al. | |
| 2015/0071502 A1* | 3/2015 | Breznicky | G06K 9/00885 382/115 |
| 2016/0012271 A1* | 1/2016 | Hansen | G06K 9/00087 382/124 |

FOREIGN PATENT DOCUMENTS

| | | | | |
|---|---|---|---|---|
| JP | 11134498 A | * | 5/1999 | G06K 9/001 |
| KR | 101291039 B1 | * | 8/2013 | |
| WO | 2008045139 A3 | | 7/2008 | |

OTHER PUBLICATIONS

Extended European Search Report dated Mar. 5, 2021 for EP Application No. 18827955.8, 7 pages.

* cited by examiner

METHOD OF A FINGERPRINT SENSING SYSTEM OF ENABLING AUTHENTICATION OF A USER BASED ON FINGERPRINT DATA

CROSS-REFERENCE TO RELATED APPLICATIONS

This application is a 371 U.S. National Stage of International Application No. PCT/SE2018/050697, filed Jun. 27, 2018, which claims priority to Swedish Patent Application No. 1750897-9, filed Jul. 7, 2017. The disclosures of each of the above applications are incorporated herein by reference in their entirety.

TECHNICAL FIELD

The invention relates to a fingerprint sensing system and a method of the fingerprint sensing system of enabling authentication of a user based on fingerprint data captured by a fingerprint sensor of the fingerprint sensing.

BACKGROUND

Electronic devices such as smart phones, laptops, remote controls, tablets, smart cards, etc., may use fingerprint recognition e.g. to allow a user to access the device, to authorize transactions carried out using the electronic device, or to authorize the user for accessing a service via the electronic device.

Hence, the electronic device, being for example a smart phone, is equipped with a fingerprint sensor on which the user places her finger in order for the sensor to capture an image of the fingerprint and compare the recorded fingerprint with a pre-stored, authenticated fingerprint template. If the recorded fingerprint matches the pre-stored template, the user is authenticated and the smart phone will perform an appropriate action, such as transitioning from locked mode to unlocked mode, in which the user is allowed access to the smart phone.

For a fingerprint sensor—being based on e.g. a capacitive, optical, or an ultrasonic detection signal from the finger—requirements on the materials present between the user's finger and the fingerprint sensing elements (known as pixels) of the sensor are high in terms of precision in thickness and material properties such as for instance dielectric homogeneity for capacitive sensors. In case of a capacitive sensor, when the user touches a fingerprint sensing area (covered by e.g. glass or ceramic) of the smart phone, a capacitor is formed between a surface of the fingerprint sensing area and the fingerprint sensor arranged inside the smart phone. By measuring the capacitance between the surface touched by the user and the sensor at each pixel, the fingerprint of the user may be derived from an image captured by the fingerprint sensor of the user's finger.

However, due to a number of reasons, impairment data in the form of quasi-stationary noise may be present in the image captured by the fingerprint sensor which renders the deriving of a fingerprint from a captured image more difficult.

For capacitive sensors, this type of noise is referred to as capacitive noise and may occur for instance due to impairments such as variations in the material stack-up height between the surface of the fingerprint sensing area and the fingerprint sensor, a damaged surface of the fingerprint sensing area in the form of for instance scratches, or due to impairments such as sensor warpage or imperfections in material properties, such as impurities in the material adhesive between the stack-up and the sensing area, and give rise to a recurring noise pattern in captured images. In order to eliminate capacitive noise, sub-μm precision and extremely pure materials may be required. In a practical scenario, such precision in materials is difficult to achieve.

US 2015/0022670 discloses a method of compensating for signal fixed pattern noise in a biometric sensing device by capturing a calibration image using a test probe and storing the calibration image, which calibration image subsequently is used for removing noise present in a newly captured fingerprint image.

A problem associated with using a calibration image, or background image, is that a malicious third party may manipulate the stored calibration image with the intent to spoof the fingerprint system to wrongly authenticate an un-authorized user.

SUMMARY

An object of the present invention is to solve, or at least mitigate, this problem in the art and provide an improved method of enabling authentication of a user based on fingerprint data captured by a fingerprint sensor, where tampering of a captured background image is hampered.

This object is attained in a first aspect of the invention by a method of a fingerprint sensing system of enabling authentication of a user based on fingerprint data captured by a fingerprint sensor of the fingerprint sensing system. The method comprises capturing at least one image of a fingerprint of a user's finger contacting the fingerprint sensor, acquiring a stored image comprising impairment data caused by impairments that the fingerprint sensor is subjected to, extracting fingerprint feature data from the captured at least one image, extracting impairment feature data from the acquired image, and comparing at least a subset of the extracted fingerprint feature data to at least a subset of the extracted impairment feature data of the acquired image, and if there is a match the user is not authenticated.

This object is attained in a second aspect of the invention by a fingerprint sensing system configured to enable authentication of a user based on fingerprint data captured by a fingerprint sensor of the fingerprint sensing system. The fingerprint sensor is configured to capture at least one image of a fingerprint of a user's finger contacting the fingerprint sensor. The fingerprint sensing system further comprises a processor unit being configured to acquire a stored image comprising impairment data caused by impairments that the fingerprint sensor is subjected to, extract fingerprint feature data from the captured at least one image, extract impairment feature data from the acquired image, and compare at least a subset of the extracted fingerprint feature data to at least a subset of the extracted impairment feature data of the acquired image, and if there is a match the user is not authenticated.

With the invention, a stored image comprising impairment data caused by impairments that the fingerprint sensor is subjected to is used to determine whether a process of authenticating a user should be terminated or not.

After having captured an image of a user's finger (or even a fake finger in a case a malicious user is attempting to spoof the fingerprint sensing system), fingerprint feature data is extracted from the captured image. Any impairment data present in the captured image will also inevitably be present in the extracted fingerprint feature data, thereby deteriorating the authentication process.

Further, impairment feature data is extracted from the stored background image, and is compared to the fingerprint feature data extracted from the captured image.

Now, if the extracted impairment data resembles the extracted fingerprint feature data, the background image is considered to have been manipulated (or does not resemble reality), and the authentication process is terminated.

This may occur if the impairment data of the manipulated background image is dominating, thereby "overshadowing" the fingerprint feature data of the captured image.

Advantageously, with this check, any further attempt to authenticate the user based on matching the captured fingerprint with a pre-stored enrolled fingerprint template is cancelled, thereby avoiding false positives due to manipulation of the background image. The user is hence not authenticated and will typically be requested to enter a pin code for the smart phone to unlock.

In an embodiment, the captured fingerprint image is processed with the stored image comprising impairment data in order to at least partly suppress any impairment data present in the captured fingerprint image, thereby resulting in an impairment data-suppressed captured image. Thereafter, fingerprint feature data is extracted from the impairment data-suppressed captured image.

Ideally, if the impairment data of the stored background image is identical to the impairment data present in the captured fingerprint image, all the impairment data present in the captured fingerprint image will be cancelled, leaving only "clean" fingerprint data in the impairment data-suppressed image.

Thereafter, fingerprint feature data is extracted from the impairment data-suppressed image, impairment feature data is extracted from the stored background image, and the extracted impairment data of the background image is compared to the fingerprint feature data extracted from the impairment data-suppressed image.

If the impairment data resembles the fingerprint feature data, the background image is considered to have been manipulated (or does not resemble reality), or that the suppression of impairment data is poor, and the authentication process is terminated.

Thus, if the impairment data of the stored background image differs from the impairment data of the captured image, there will be a residual error. Now, if the impairment data of the (manipulated) background image is dominating, strong residual impairment data is present, which will overshadow the fingerprint feature data.

Again, with this check, any further attempt to authenticate the user based on matching the captured fingerprint with a pre-stored enrolled fingerprint template is cancelled, thereby advantageously avoiding false positives due to manipulation of the background image (or due to poor impairment data-cancellation). The user is hence not authenticated and will typically be requested to enter a pin code for the smart phone to unlock.

In a further embodiment, the background image is captured using a finger, wherein a plurality of images of the user's finger is captured, the images comprising impairment data caused by impairments that the fingerprint sensor is subjected to. Thereafter, from the plurality of captured images of the fingerprint, a new image is created comprising the impairment data, which new image replaces the previously stored image comprising impairment data. Subsequently, the new updated background image is used for detecting manipulation of the system.

Advantageously, with this embodiment, updating of the stored background image is enabled. Since the electronic device in which the fingerprint sensing system is implemented, being for instance a smart phone, is subjected to wear—for instance in the form of scratches and cracks in a cover glass covering the fingerprint sensor—the impairments that the sensor is subjected to may change over time. With this embodiment, such changes are taken into account with a new background image.

Further embodiments will be discussed in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
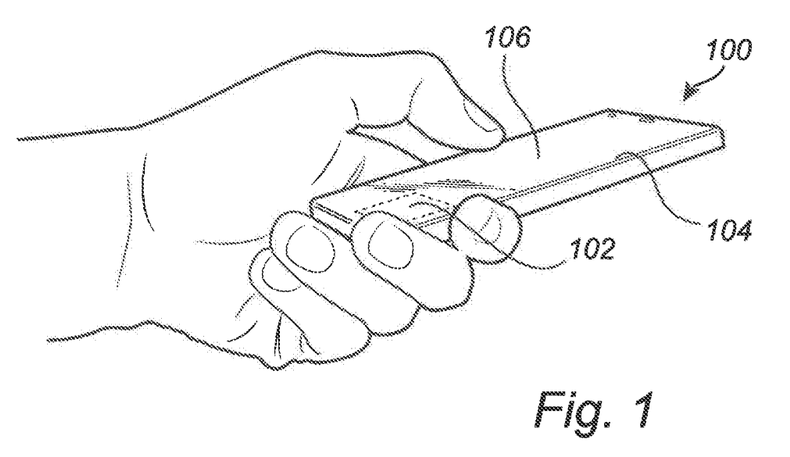
FIG. 1 shows an electronic device in the form of a smart phone in which the present invention may be implemented.

FIG. 1 shows an electronic device in the form of a smart phone 100 in which the present invention may be implemented. The smart phone 100 is equipped with a fingerprint sensor 102 and a display unit 104 with a touch screen interface 106. The fingerprint sensor 102 may, for example, be used for unlocking the mobile phone 100 and/or for authorizing transactions carried out using the mobile phone 100, etc. The fingerprint sensor 102 may alternatively be placed on the backside of the mobile phone 100. It is noted that the fingerprint sensor 102 could be integrated in the display unit/touch screen or form part of a smart phone home button.

It is understood that the fingerprint sensor 102 according to embodiments of the invention may be implemented in other types of electronic devices, such as laptops, remote controls, tablets, smart cards, smartwatches, etc., or any other type of present or future similarly configured device utilizing fingerprint sensing.

Figure 2:
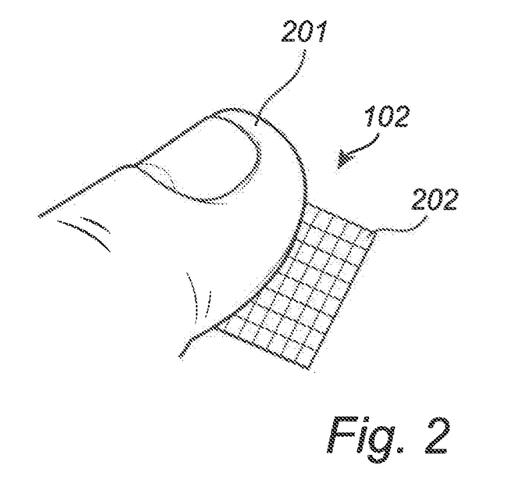
FIG. 2 shows a view of a fingerprint sensor onto which a user places the finger.

FIG. 2 illustrates a somewhat enlarged view of the fingerprint sensor 102 onto which a user places her finger 201. In the case of employing a capacitive sensing technology, the fingerprint sensor 102 is configured to comprise a plurality of sensing elements. A single sensing element (also denoted as a pixel) is in FIG. 2 indicated by reference numeral 202.

It is noted that the present invention is equally applicable to other fingerprint sensing technologies, such as e.g. optical or ultrasonic sensing.

Figure 3:
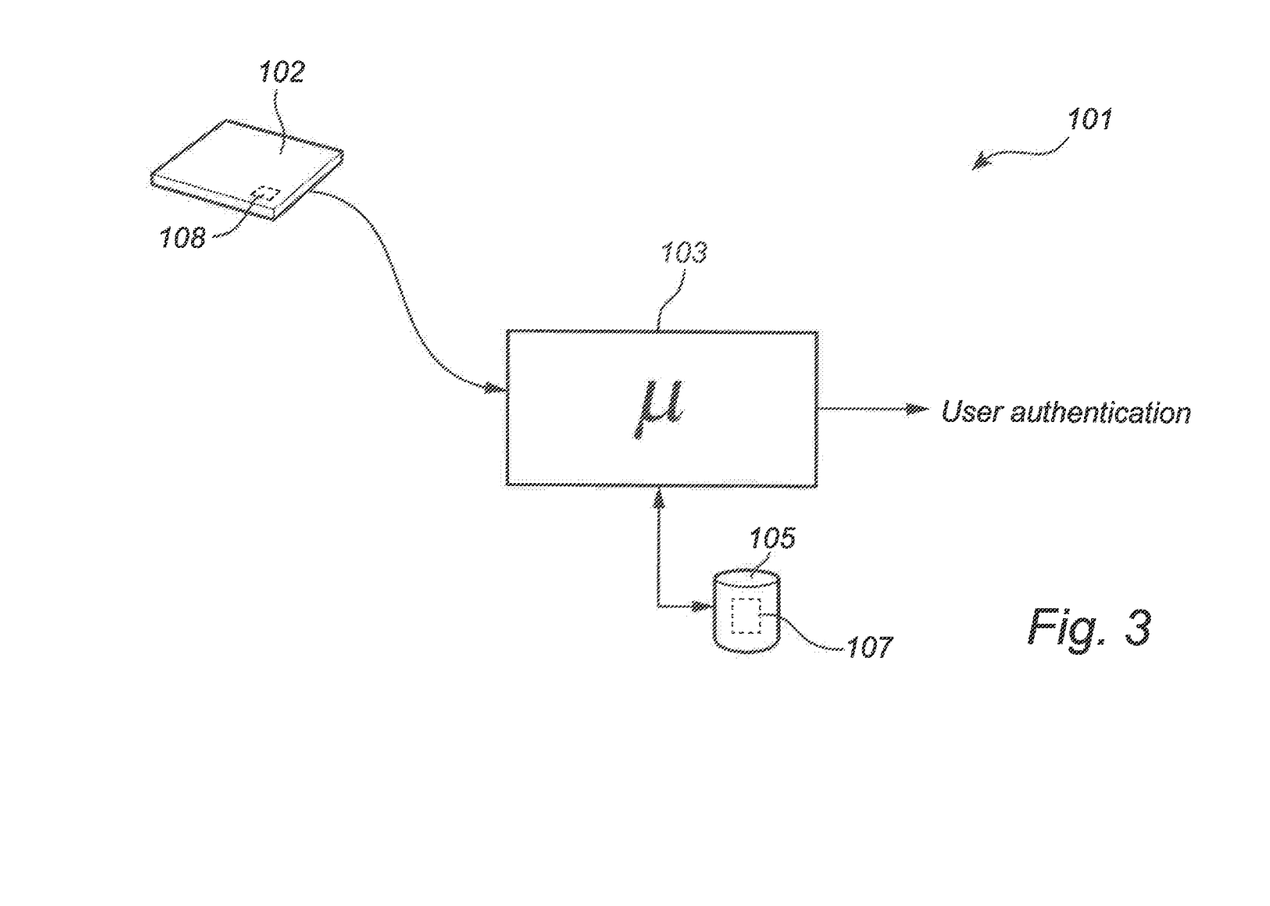
FIG. 3 shows a fingerprint sensor being part of a fingerprint sensing system according to an embodiment.

FIG. 3 shows the fingerprint sensor 102 being part of a fingerprint sensing system 101. The fingerprint sensing system 101 comprises the fingerprint sensor 102 and a processing unit 103, such as a microprocessor, for controlling the fingerprint sensor 102 and for analysing captured fingerprints. The fingerprint sensing system 101 further comprises a memory 105. The fingerprint sensing system 101 in turn, typically, forms part of the electronic device 100 as exemplified in FIG. 1. A local memory 108 such as a one-time programmable (OTP) memory, flash memory, or random access memory (RAM) may be embedded in the sensor die.

Now upon an object contacting the fingerprint sensor 102, the sensor 102 will capture an image of the object in order to have the processing unit 103 determine whether the object is a fingerprint of an authorised user or not by comparing the captured fingerprint to one or more authorised fingerprint templates pre-stored in the memory 105.

The fingerprint sensor 102 may be implemented using any kind of current or future fingerprint sensing principle, including for example capacitive, optical, ultrasonic or thermal sensing technology. Currently, capacitive sensing is most commonly used, in particular in applications where size and power consumption are important. Capacitive fingerprint sensors provide an indicative measure of the capacitance between (see FIG. 2) several sensing elements 202 and a finger 201 placed on the surface of the fingerprint sensor 102. Acquisition of a fingerprint image is typically performed using a fingerprint sensor 102 comprising a plurality of sensing elements 202 arranged in a two-dimensional manner.

In a general authorization process, the user places her finger 201 on the sensor 102 for the sensor to capture an image of the fingerprint of the user. The processing unit 103 evaluates the captured fingerprint and compares it to one or more authenticated fingerprint templates stored in the memory 105. If the recorded fingerprint matches the pre-stored template, the user is authenticated and the processing unit 103 will typically instruct the device (e.g. smart phone) 100 to perform an appropriate action, such as transitioning from locked mode to unlocked mode, in which the user is allowed access to the smart phone 100.

With reference again to FIG. 3, the steps of the method performed by the fingerprint sensing system 101 are in practice performed by the processing unit 103 embodied in the form of one or more microprocessors arranged to execute a computer program 107 downloaded to the storage medium 105 associated with the microprocessor, such as a Random Access Memory (RAM), a Flash memory or a hard disk drive. The processing unit 103 is arranged to cause the fingerprint sensing system 101 to carry out the method according to embodiments when the appropriate computer program 107 comprising computer-executable instructions is downloaded to the storage medium 105 and executed by the processing unit 103. The storage medium 105 may also be a computer program product comprising the computer program 107. Alternatively, the computer program 107 may be transferred to the storage medium 105 by means of a suitable computer program product, such as a Digital Versatile Disc (DVD) or a memory stick. As a further alternative, the computer program 107 may be downloaded to the storage medium 105 over a network. The processing unit 103 may alternatively be embodied in the form of a digital signal processor (DSP), an application specific integrated circuit (ASIC), a field-programmable gate array (FPGA), a complex programmable logic device (CPLD), etc. It should further be understood that all or some parts of the functionality provided by means of the processing unit 103 may be at least partly integrated with the fingerprint sensor 102.

Figure 4:
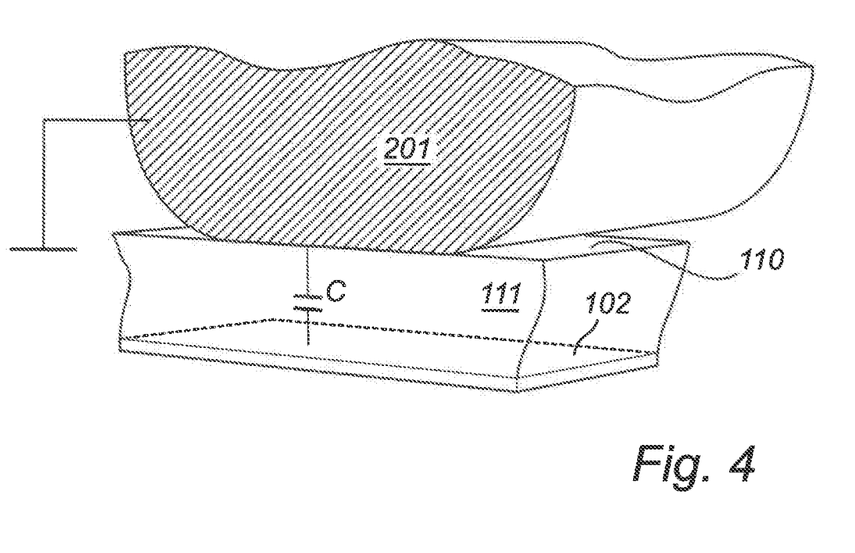
FIG. 4 illustrates the principle for capacitive fingerprint sensing.

FIG. 4 illustrates the principle for capacitive fingerprint sensing, as previously has been discussed. Upon a user contacting a surface 110 of a fingerprint sensing area of the smart phone with her finger 201, a capacitor C is formed between the surface 110 of the fingerprint sensing area and the fingerprint sensor 102 arranged inside the smart phone. The material 111 between the surface 110 and the fingerprint sensor 102 may be composed of e.g. glass or ceramic.

By measuring the capacitance between the surface 110 touched by the user and the sensor 102, the fingerprint of the user may be derived from an image captured by the fingerprint sensor 102 of the user's finger 201.

Due to various impairments, such as variations in the stack-up height of the material in between the surface 110 of the fingerprint sensing area and the fingerprint sensor 102, a damaged surface 110, sensor warpage, general imperfections in the properties of the material 111 quasi-stationary noise will be present in the images captured by the fingerprint sensor 102 which renders the deriving of a fingerprint from the captured images more difficult.

Similar noise is also present in case of using optical or ultrasonic fingerprint sensing technologies.

It is desirable to take into account such noise—or impairment data—when extracting fingerprint feature data from captured images. The extracted fingerprint feature data is subsequently used for performing authentication, for instance for unlocking a smart phone 100 in which the fingerprint sensing system 100 is arranged, given that the captured fingerprint matches a pre-stored and authenticated fingerprint template.

With reference again to FIG. 4, during manufacturing and testing of the fingerprint sensor 102, a test device may be applied to the surface 110 of the fingerprint sensing area of the smart phone instead of a real finger. The test device may be embodied by an object commonly referred to as a (flat)

rubber stamp. This rubber stamp typically entirely covers the area 110, and correspondingly all pixels of the fingerprint sensor 102. Such a rubber stamp is typically electrically conductive and connected to ground, in order to present an appropriately high capacitance to the sensor 102. Preferably the total capacitance generated by the rubber stamp should be the same as for a typical human finger. The rubber stamp is commonly used for testing fingerprint sensors.

Figure 5:
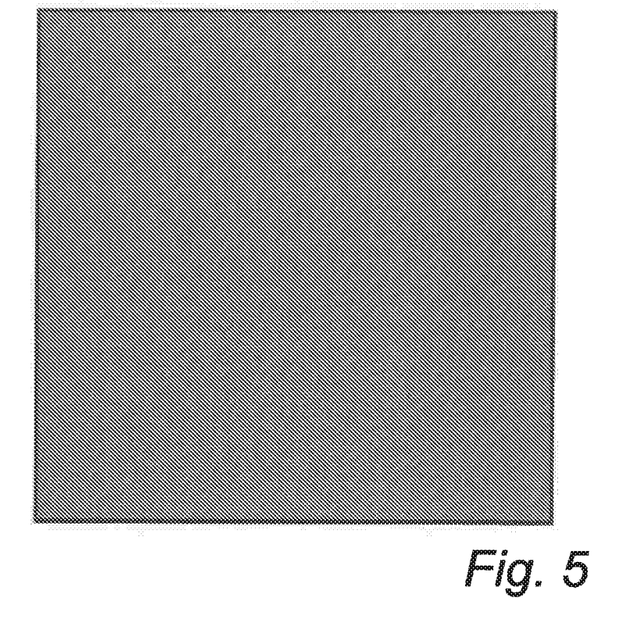
FIG. 5 illustrates an image captured by a fingerprint sensor where the object contacting the sensor is a rubber stamp.

With reference to FIG. 5, for a "perfect" sensor 102, surface 110 and material 111, an image captured by the sensor 102 of such a rubber stamp would be a uniformly black/grey, without any impairment data in the form of artefacts or noise present in the image, whereas in practice where the sensor 102, surface 110 and material 111 are subjected to impairments, impairment data forming some type of pattern is oftentimes present in the captured image.

Figure 6A:
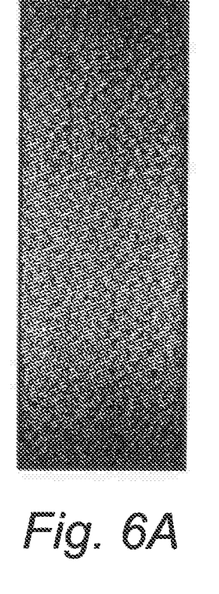
FIGS. 6A-C illustrate images captured by different individuals of fingerprint sensors being subjected to different impairments.
Figure 6B:
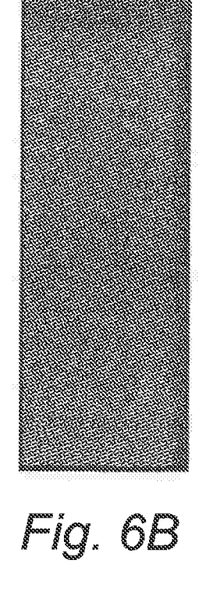
Figure 6C:
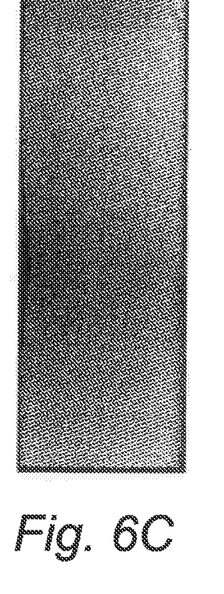

However, in practice, with reference to FIGS. 6A-C, different individuals of fingerprint sensors are subjected to different impairments, which as a result will give different appearances of the captured rubber stamp image.

Figure 7:
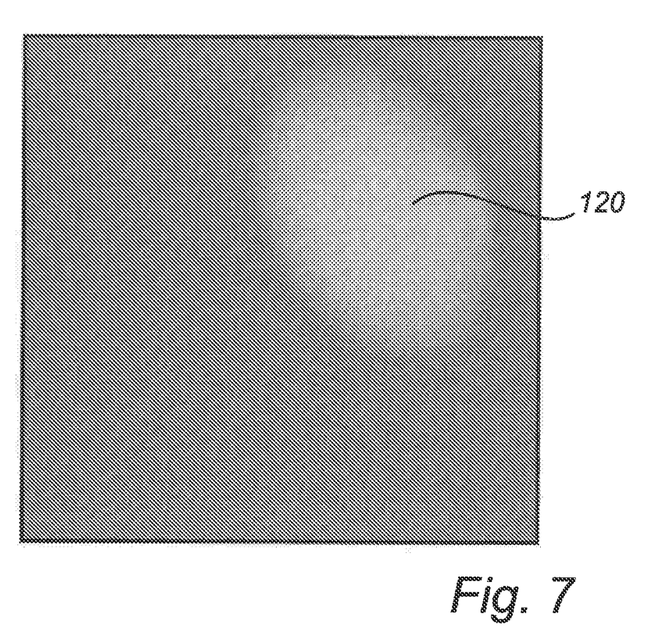
FIG. 7 illustrates the captured image of FIG. 5, but where the image further comprises impairment data.

FIG. 7 illustrates a further example of impairment data 120 present in the captured image in the form of more evident impairment data arranged in a circular or elliptic pattern. This is a pattern which may be the result of an air pocket created in the glass/ceramic material 111 between the surface 110 of the fingerprint sensing area and the fingerprint sensor 102, or by impurities in the glue between the sensor and the cover glass.

No matter the exact appearance of the impairment data present in a captured image, any impairment data will render the extraction of a fingerprint from a captured image more difficult, since the impairment data will obscure the fingerprint feature data present in a captured image.

However, by capturing the image comprising the impairment data 120, which in the following will be referred to as the "background image", the image can be stored and subsequently used for removing the impairment data from a newly captured fingerprint image, since the newly captured image also will comprise the fingerprint data of the background image.

As previously has been discussed, a problem in using a captured background image as illustrated in FIG. 7 to remove noise from subsequently captured fingerprint images is that a malicious third party may manipulate the stored background image with the intent to spoof the fingerprint system to wrongly authenticate an un-authorized user.

Figure 8:
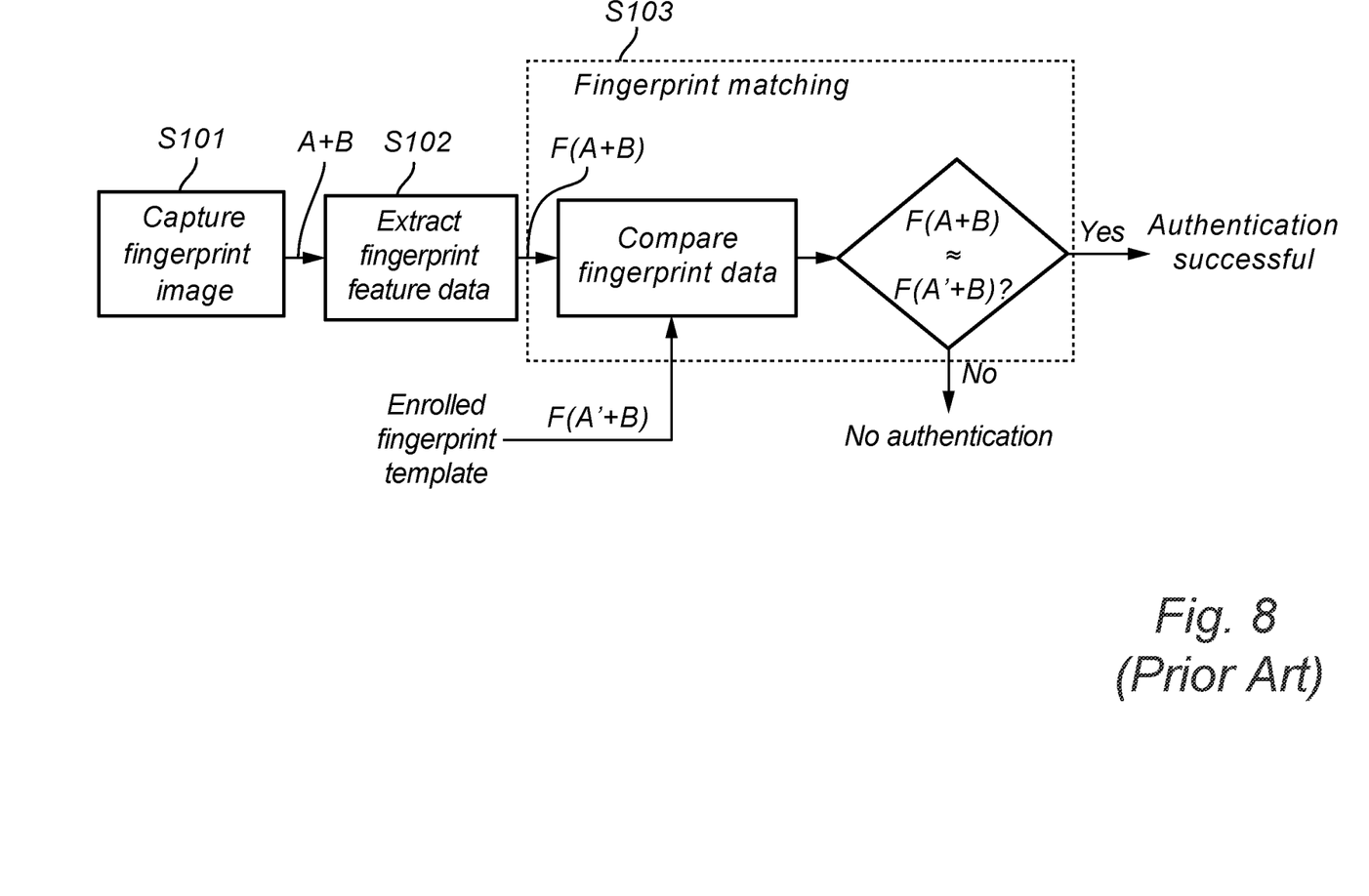
FIG. 8 illustrates a flowchart of a prior art method of authenticating a user in a fingerprint sensing system.

FIG. 8 illustrates a flowchart of a prior art method of authenticating a user in a fingerprint sensing system 101. When a user of the electronic device 100 in which the fingerprint system 101 is arranged wishes to perform an authentication process with the electronic device being e.g. a smart phone, for instance by pressing her thumb against a fingerprint sensing area on a glass cover of the smart phone under which the fingerprint sensor 102 is arranged for unlocking the smart phone 100, the fingerprint sensor 102 captures an image of the fingerprint of the user in step S101. In this image, the data relating to the actual fingerprint is denoted A, while the impairment data in the captured image is denoted B.

In step S102, the processing unit 103 extracts fingerprint feature data from the captured image of the fingerprint, i.e. data in the image representing fingerprint ridges and valleys, where the extracted fingerprint feature data is denoted F(A+B). As can be concluded from this notation, any impairment data B present in the captured image will also be present in the extracted fingerprint feature data, thereby deteriorating the authentication process.

After the fingerprint features have been extracted in step S102, the processing unit 103 compares it to one or more previously enrolled fingerprint templates stored in the memory 105, the enrolled templates being denoted F(A'+B).

If the extracted fingerprint matches the pre-stored template in step S103—i.e. F(A+B)=F(A'+B), or at least F(A+B)≈F(A'+B)—the user is authenticated and the processing unit 103 will typically instruct the electronic device 100, being e.g. a smart phone, to perform an appropriate action, such as transitioning from locked mode to unlocked mode, in which the user is allowed access to the smart phone 100. If not, the user is not authenticated and will typically be requested to enter a pin code for the smart phone to unlock.

In this context, it is noted that in case the user is not an enrolled user, i.e. the extracted fingerprint data constitutes for instance F(C+B), the user should not be authenticated, since F(C+B)≠F(A'+B).

Further, it is desirable to cancel out the impairment data B as it has a tendency to obscure the fingerprint data A and A' and thus aggravates the matching process.

Figure 9:
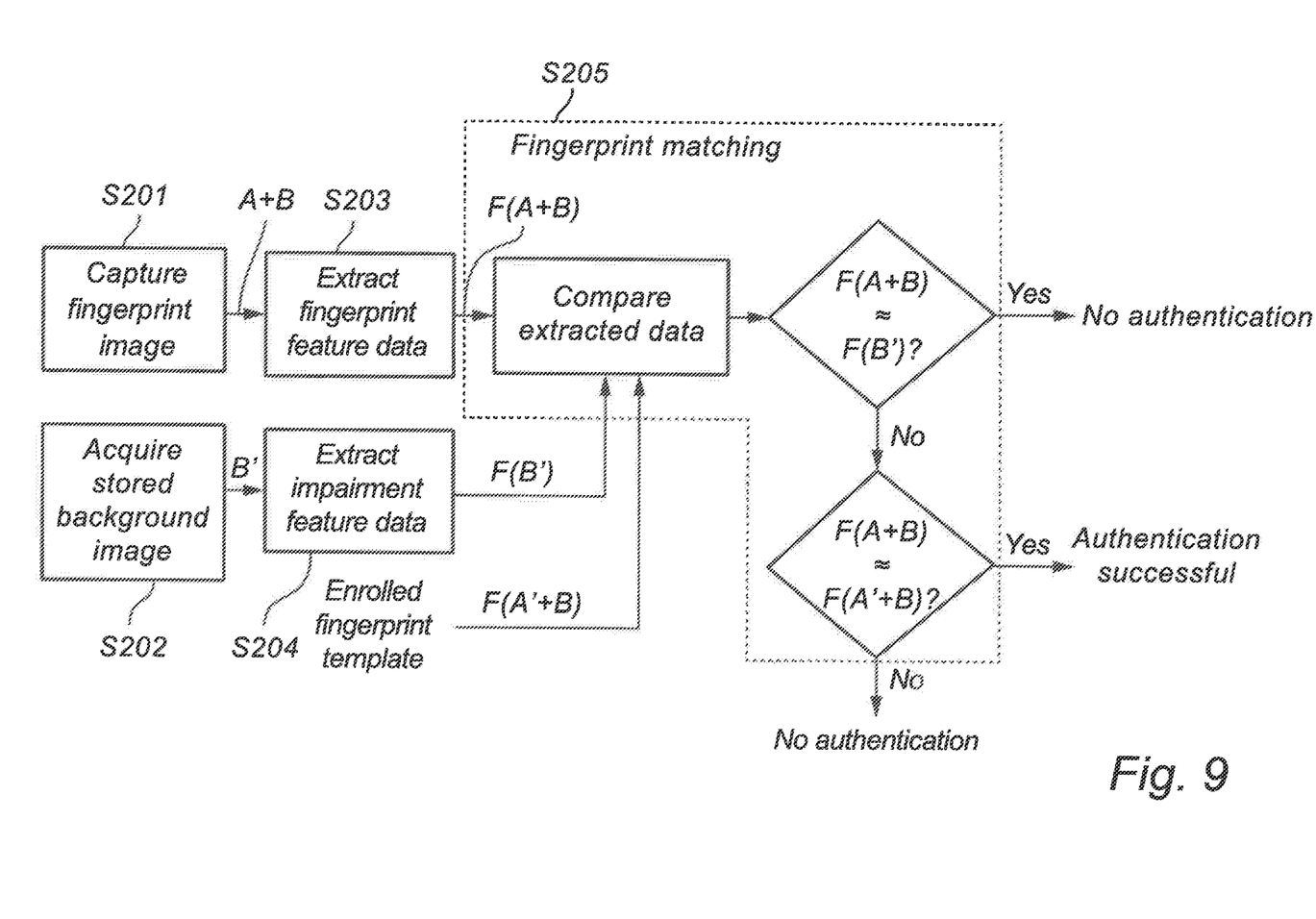
FIG. 9 illustrates a flowchart of a method of authenticating a user in a fingerprint sensing system according to an embodiment of the present invention.

FIG. 9 illustrates a flowchart of a method of authenticating a user in a fingerprint sensing system 101 according to an embodiment of the present invention, which hampers any manipulation of the background image by a malicious third party as previously has been discussed.

Hence, when a user of the electronic device 100 in which the fingerprint system 101 is arranged wishes to perform an authentication process with the electronic device being e.g. a smart phone, for instance by pressing her thumb against a fingerprint sensing area on a glass cover of the smart phone under which the fingerprint sensor 102 is arranged for unlocking the smart phone 100, the fingerprint sensor 102 captures an image of the fingerprint of the user in step S201. As in FIG. 8, the data relating to the actual fingerprint is denoted A, while the impairment data in the captured image is denoted B.

Figure 10A:
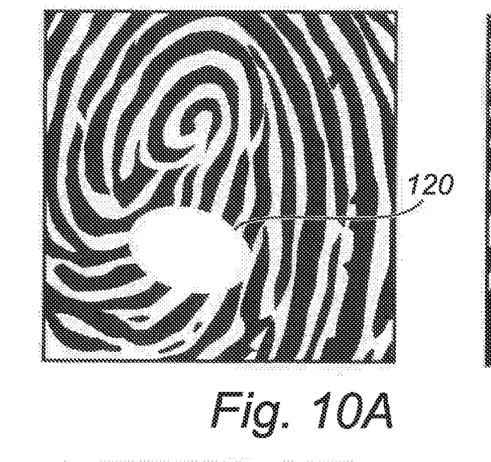
FIGS. 10A-D illustrate four captured fingerprint images comprising impairment data.
Figure 10B:
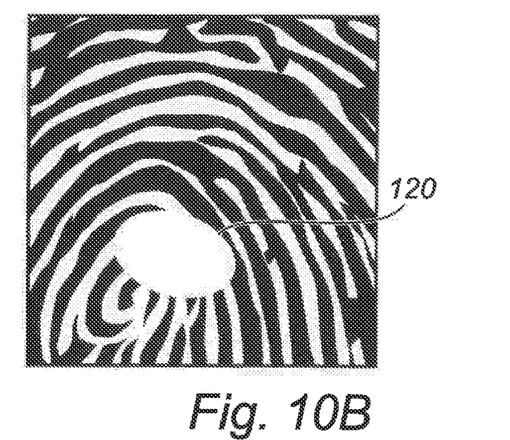
Figure 10C:
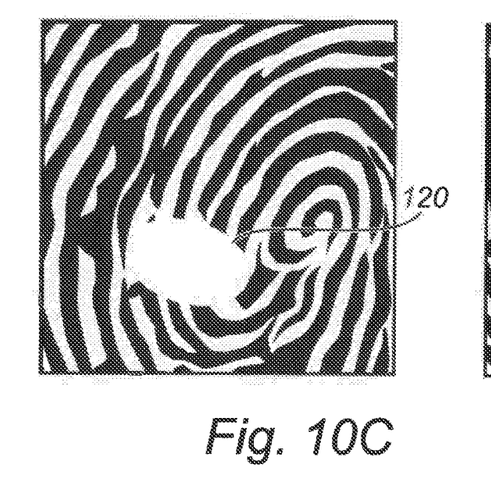
Figure 10D:
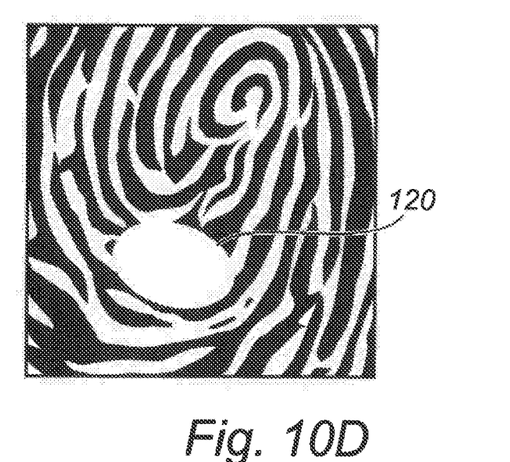

Reference is made to FIG. 10A illustrating a captured image of a fingerprint comprising the impairment data 120. In this exemplifying embodiment, the captured image comprises elliptically-shaped impairment data 120 (it should be noted that this is an illustrative example only; the impairment data can take on many forms and patterns).

Now, in this embodiment of the invention, the processing unit 103 further acquires a background image in step S202.

Such a background image may be captured by the fingerprint sensor 102 by having an object referred to as a rubber stamp contacting the sensor 102, a "perfect" image of which was illustrated in FIG. 5. It is noted that several images may be captured, and that these images are combined to produce a single image representing the impairment data that the fingerprint sensor is subjected to (due to e.g. glass cover scratches, component stack-up in the phone, impurities in the glue between the sensor and the cover glass, etc.). This image may be captured during a manufacturing test of the fingerprint system 101 mounted in an intended electronic device 100, such as a smart phone, and stored in the fingerprint system 101, for example in the OTP memory 108 embedded in the sensor die, or in a host memory of the electronic device 100. It is envisaged that the captured image(s) are downsampled or compressed before being stored.

Figure 11:
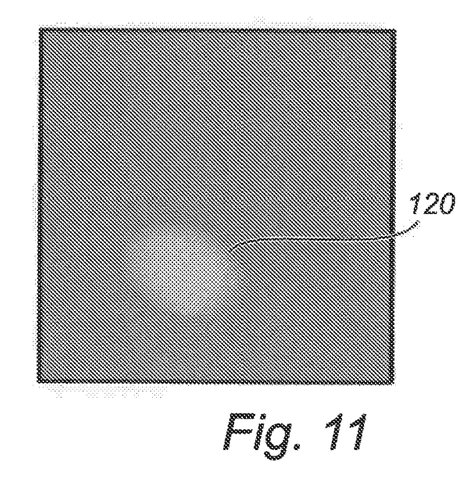
FIG. 11 illustrates a stored background image comprising elliptically shaped impairment data.

In this exemplifying embodiment, the captured background image is assumed to have the appearance shown in FIG. 11, i.e. comprising elliptically-shaped impairment data 120 as was reflected in the captured fingerprint image of FIG. 10A. The impairment data of the stored background image is denoted B'.

In step S203, the processing unit 103 extracts fingerprint feature data from the captured image of the fingerprint, i.e. data in the image representing fingerprint ridges and valleys, where the extracted fingerprint feature data is denoted F(A+B). Again, any impairment data B present in the captured image will also be present in the extracted fingerprint feature data, thereby deteriorating the authentication process.

In step S204, the processing unit 103 also extracts impairment feature data from the stored background image, which is denoted F(B').

After the fingerprint features have been extracted in step S202, and the impairment data has been extracted in step S204, the processing unit 103 compares the extracted fingerprint features F(A+B) to the impairment data F(B') of the background image in the fingerprint matching step S205.

Now, if the impairment data F(B') resembles the extracted fingerprint feature data F(A+B)—i.e. F(A+B)=F(B'), or at least F(A+B)≈F(B')—i.e. a predetermined similarity criterion is fulfilled—the background image is considered to have been manipulated (or does not resemble reality), and the authentication process is terminated. Advantageously, with this check, any further attempt to authenticate the user based on the captured fingerprint F(A+B) is cancelled, thereby avoiding false positives due to manipulation of the background image. The user is hence not authenticated and will typically be requested to enter a pin code for the smart phone to unlock.

Such manipulation could occur over time by an imposter combining a new background image with a (genuine) fingerprint image and simply use a flat rubber stamp to manipulate the system. Such a manipulation could further potentially occur if e.g. the cover glass is broken thereby subjecting the fingerprint sensor to new impairment (and thus changing conditions).

If there is no match, i.e. F(A+B)≠F(B'), the extracted fingerprint data is compared to one or more of the previously enrolled fingerprint templates stored in the memory 105, the enrolled templates being denoted F(A'+B).

If the extracted fingerprint matches the pre-stored template in step S205—i.e. F(A+B)=F(A'+B), or at least F(A+B)≈F(A'+B)—the user is authenticated and the processing unit 103 will typically instruct the electronic device 100, being e.g. a smart phone, to perform an appropriate action, such as transitioning from locked mode to unlocked mode, in which the user is allowed access to the smart phone 100. If not, the user is not authenticated and will typically be requested to enter a pin code for the smart phone to unlock.

As can be concluded from FIG. 9, even in a situation where the impairment data B' of the stored background image is not used for cancelling the impairment data B present in the captured fingerprint image, the impairment data B' of the stored background image can still be used for detecting a spoofing attempt in the form of manipulation of the stored background image. Further, the embodiment of FIG. 9 advantageously prevents matches that are primarily based on a good match to the impairment data (rather than the fingerprint).

Figure 12:
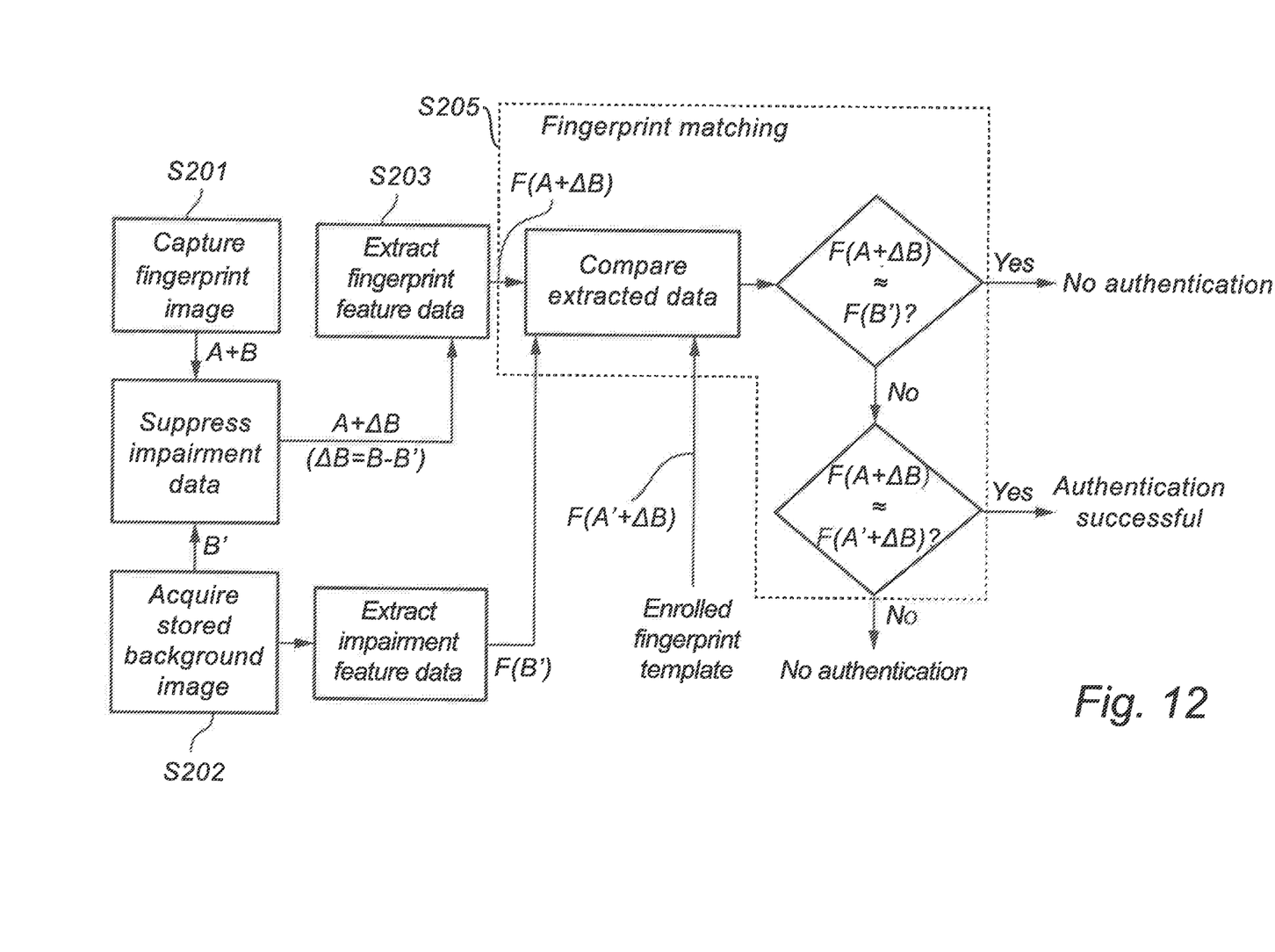
FIG. 12 illustrates a flowchart of a method of authenticating a user in a fingerprint sensing system according to a further embodiment of the present invention.

FIG. 12 illustrates a flowchart of a method of authenticating a user in a fingerprint sensing system 101 according to a further embodiment of the present invention, which utilizes the stored background image for suppressing impairment data in a subsequently captured fingerprint image.

With this embodiment, it may be detected whether manipulation of the background image by a malicious third party has occurred or not, or whether the suppression is successful or not.

Again, the fingerprint sensor 102 captures an image of the fingerprint of the user in step S201. As previously, the data relating to the actual fingerprint is denoted A, while the impairment data in the captured image is denoted B.

The processing unit 103 further acquires the previously stored background image in step S202, the impairment data of which image is denoted B'.

In this embodiment, prior to performing fingerprint feature extraction in step S203, the background image is used in step S202a to at least partly suppress some or all of the impairment data B present in the image captured in step S201. This is illustrated by means of a subtracting operation where the captured fingerprint image comprises fingerprint data and impairment data A+B, while the background image comprises impairment data B', and the result of the suppression of step S202a is A+B−B', where B−B' for brevity is denoted $\Delta B$.

Ideally, if the impairment data B' is identical to the impairment data B of the present image, $\Delta B$ will be zero, and all the impairment data will be cancelled, leaving only "clean" fingerprint data A in the impairment data-suppressed image.

Now, in step S203, fingerprint feature data is extracted from the impairment data-suppressed image of step S202a, where the extracted fingerprint feature data in this case is denoted F(A+$\Delta B$).

In step S204, the processing unit 103 extracts impairment feature data from the stored background image, which is denoted F(B').

As regards the enrolled fingerprint template denoted F(A'+$\Delta B$), the background image is assumed to have been utilized also for the enrolled template to cancel out any impairment data in the enrolled template in this embodiment.

After the fingerprint features have been extracted in step S203 from the impairment data-suppressed image, and the impairment data has been extracted in step S204, the processing unit 103 compares the extracted fingerprint features F(A+$\Delta B$) to the impairment data F(B') of the background image in the fingerprint matching step S205.

Now, if the impairment data F(B') resembles the fingerprint feature data F(A+$\Delta B$) extracted from the impairment data-suppressed image, i.e. F(A+$\Delta B$)=F(B'), or at least F(A+$\Delta B$)≈F(B')—i.e. a predetermined similarity criterion is fulfilled and there is a match—the background image is considered to have been manipulated (or does not resemble reality), or that the suppression of impairment data in step S202a is poor, and the authentication process is terminated.

Thus, if the impairment data B' of the stored background image differs from the impairment data B of the captured image, there will be a residual error, and $\Delta B \neq 0$. Now, if the impairment data B' of the manipulated background image is dominating, strong residual impairment data $\Delta B = B − B'$ is present, which will "overshadow" the fingerprint feature data A.

Advantageously, with this check, any further attempt to authenticate the user based on the impairment data-suppressed features F(A+$\Delta B$) is cancelled, thereby avoiding false positives. The user is hence not authenticated and will typically be requested to enter a pin code for the smart phone to unlock.

If there is no match, i.e. F(A+$\Delta B$)≠F(B'), the extracted fingerprint data is compared to one or more of the previously enrolled fingerprint templates stored in the memory 105, the enrolled templates being denoted F(A'+$\Delta B$).

If the extracted fingerprint matches the pre-stored template in step S205—i.e. F(A+$\Delta B$)=F(A'+$\Delta B$), or at least $F(A+\Delta B) \approx F(A'+\Delta B)$—the user is authenticated and the processing unit 103 will typically instruct the electronic device 100, being e.g. a smart phone, to perform an appropriate action, such as transitioning from locked mode to unlocked mode, in which the user is allowed access to the smart phone 100. If not, the user is not authenticated and will typically be requested to enter a pin code for the smart phone to unlock.

In an embodiment, if it is determined that it is the suppression itself that is poor, and likely not that the background image has been manipulated, a new background image is captured.

For instance, the fingerprint sensing system 100 may, via the display of the smart phone 100, query a user of the phone whether for instance any cracks or breakage recently has occurred in the glass cover under which the fingerprint sensor 102 is located. If so, the stored background image may no longer correctly reflect the impairment data that the sensor is subjected to, resulting in a poor suppression of the impairment data.

Figure 13:
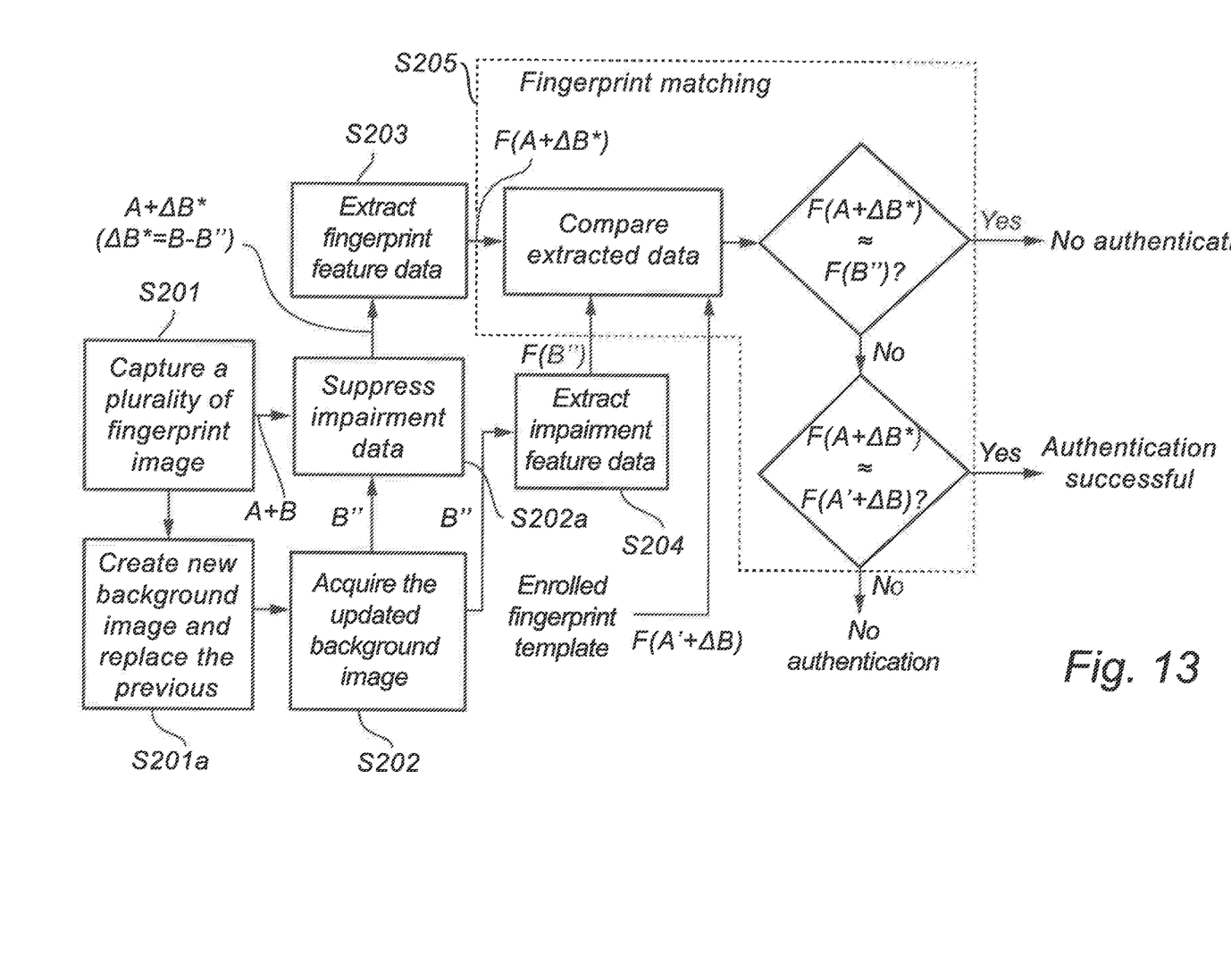
FIG. 13 illustrates a flowchart of a method of authenticating a user in a fingerprint sensing system according to yet a further embodiment of the present invention.

FIG. 13 illustrates a flowchart of a method of authenticating a user in a fingerprint sensing system 101 according to yet a further embodiment of the present invention, which utilizes a new stored background image for suppressing impairment data in a captured fingerprint image.

With this embodiment, updating of the stored background image is enabled. Since the electronic device 100 is subjected to wear—for instance in the form of scratches and cracks in a cover glass covering the sensor 102—the impairments that the sensor 102 is subjected to may change over time.

In this embodiment, the fingerprint sensor 102 captures a plurality of images of the fingerprint of the user in step S201. This may be performed during a designated background image updating process, or during normal user operation of the electronic device 100.

Thereafter, a new background image is created in step S201a from the plurality of captured fingerprint images and replaces the previously stored background image.

As can be seen in FIGS. 10A-D, illustrating four different exemplifying fingerprint images captured by the fingerprint sensor 102, with respect to the actual fingerprint of the user, no image is likely to be identical to the other, as the user does not press her finger against the surface of the sensing area in the same manner for every captured image. Thus, in the four images illustrated in FIGS. 10A-D, the user's fingerprint is differently positioned, while the impairment data 120 which is caused by the electronic device 100, or the sensor 102 itself, remains constantly positioned in the captured images.

After the plurality of images of the user's fingerprint has been captured in step S201, a single image is created in step S201a from the plurality of images. In practice, tens of images may be captured, or even up to hundreds.

In an embodiment, the single image is created by combining the plurality of images captured in step S201. For instance, the single image may be created by averaging the plurality of captured fingerprint images in step S201a.

FIG. 11 illustrates how the single image would look like when the plurality of captured fingerprint images is averaged to create the single image. As was discussed hereinabove—for the plurality of captured images—the part of each captured image representing the fingerprint will differ from one image to another. The averaging process would thus have a filtering effect on the plurality of images and create an image similar to the rubber stamp image, i.e. an image which is uniformly grey, with the exception of the impairment data 120 which remains constantly positioned throughout the plurality of images. This is important; if the part of the images pertaining to the actual fingerprint of the user is not "blurred out" when creating the single image, there is a risk that impairment data will not be suppressed correctly and that there could even be further impairment data introduced in a subsequently captured fingerprint image. Hence, it is noted that a background image captured using multiple fingerprints will look more or less identical to a background image captured using a flat rubber stamp.

The created new image is stored as a background image in place of the previously stored background image.

Hence, upon performing an authentication process, the processing unit 103 acquires in step S202 the stored updated background image, the impairment data of which image is denoted B" in order to distinguish from impairment data B' of the previously stored, but now replaced, background image.

As in previous embodiments, the data of a captured image relating to the actual fingerprint is denoted A, while the impairment data in the captured image is denoted B.

Prior to performing fingerprint feature extraction in step S203, the updated background image is used in step S202a to at least partly suppress some or all of the impairment data B present in the image captured in step S201. This is illustrated by means of a subtracting operation where the captured fingerprint image comprises fingerprint data and impairment data A+B, while the updated background image comprises impairment data B", and the result of the suppression of step S202a is A+B−B", where B−B" for brevity is denoted ΔB*.

Ideally, if the impairment data B" of the updated background image is identical to the impairment data B of the captured fingerprint image, ΔB* will be zero, and all the impairment data of the captured fingerprint image will be cancelled, leaving only "clean" fingerprint data A in the impairment data-suppressed image.

Figure 14:
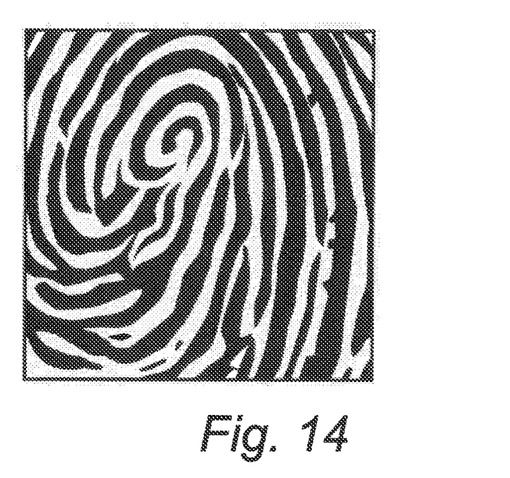
FIG. 14 illustrates an impairment data-suppressed version of the fingerprint of FIG. 10A.

This is illustrated in FIG. 14, being an impairment data-suppressed, "clean" version of the fingerprint of FIG. 10A.

Now, in step S203, fingerprint feature data is extracted from the impairment data-suppressed image of step S202a, where the extracted fingerprint feature data is denoted $F(A+\Delta B^*)$.

In step S204, the processing unit 103 extracts impairment feature data from the stored updated background image, which is denoted F(B").

As regards the enrolled fingerprint template, the updated background image is in the embodiment illustrated in FIG. 13 assumed not to have been utilized also for the enrolled template to cancel out any impairment data in the enrolled template, resulting in an the "old" template $F(A'+\Delta B)$ being used. In an alternative embodiment, the user re-enrols with the system upon the background image being updated, resulting in a new template $F(A'+\Delta B^*)$ being used.

After the fingerprint features have been extracted in step S203 from the impairment data-suppressed image, and the impairment data has been extracted in step S204, the processing unit 103 compares the extracted fingerprint features $F(A+\Delta B^*)$ to the impairment data F(B") of the updated background image in the fingerprint matching step S205.

Now, if the impairment data F(B") resembles the fingerprint feature data $F(A+\Delta B^*)$ extracted from the impairment data-suppressed image, i.e. $F(A+\Delta B^*)=F(B")$, or at least $F(A+\Delta B^*) \approx F(B")$—i.e. a predetermined similarity criterion is fulfilled and there is a match—the background image is considered to have been manipulated, or that the suppression of impairment data in step S202a is poor, and the authentication process is terminated.

It is noted that in case $F(A+\Delta B^*) \approx F(B'')$ during a time period after the background image has been updated, it is likely that the background image has been manipulated, since the impairment data B" of a recently updated background image most likely resembles the actual impairment data B present in a captured image.

Thus, if the impairment data B" of the stored updated background image differs from the impairment data B of the captured image, there will be a residual error, and $\Delta B \neq 0$. Now, if the impairment data B" of the manipulated updated background image is dominating, strong residual impairment data $\Delta B^* = B - B''$ is present, which will "overshadow" the fingerprint feature data A.

Advantageously, with this check, any further attempt to authenticate the user based on the impairment data-suppressed features $F(A+\Delta B^*)$ is cancelled, thereby avoiding false positives. The user is hence not authenticated and will typically be requested to enter a pin code for the smart phone to unlock.

If there is no match, i.e. $F(A+\Delta B^*) \neq F(B'')$, the extracted fingerprint data is compared to one or more of the previously enrolled fingerprint templates stored in the memory 105, the enrolled templates being denoted $F(A'+\Delta B)$.

If the extracted fingerprint matches the pre-stored template in step S205—i.e. $F(A+\Delta B^*) = F(A'+\Delta B)$, or at least $F(A+\Delta B^*) \approx F(A'+\Delta B)$—the user is authenticated and the processing unit 103 will typically instruct the electronic device 100, being e.g. a smart phone, to perform an appropriate action, such as transitioning from locked mode to unlocked mode, in which the user is allowed access to the smart phone 100. If not, the user is not authenticated and will typically be requested to enter a pin code for the smart phone to unlock.

As previously has been discussed, any case here a re-enrolment of the user is performed upon updating the background image, the enrolled template will be denoted $F(A'+\Delta B^*)$, and a corresponding matching process will be performed in S205 by determining whether $F(A+\Delta B^*) \approx F(A'+\Delta B^*)$ or not.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of a fingerprint sensing system of enabling authentication of a user based on fingerprint data captured by a fingerprint sensor of the fingerprint sensing system with an authentication process, comprising:
    capturing at least one image of a fingerprint of a user's finger contacting the fingerprint sensor;
    acquiring a stored image comprising impairment data caused by impairments that the fingerprint sensor is subjected to;
    extracting fingerprint feature data from the captured at least one image;
    extracting impairment feature data from the acquired image; and
    comparing at least a subset of the extracted fingerprint feature data to at least a subset of the extracted impairment feature data of the acquired image, and
    wherein: (i) if there is a match the authentication process is terminated and the user is not authenticated, and (ii) if there is no match the extracted fingerprint feature data is compared with enrolled authorised fingerprint feature data to determine authentication of the user.

2. The method of claim 1, further comprising:
    processing the captured at least one image of a fingerprint with the stored image comprising impairment data in order to at least partly suppress the impairment data in the captured at least one image of a fingerprint, thereby resulting in an impairment data-suppressed captured image,
    wherein the extracting of fingerprint feature data from the captured at least one image comprises:
        extracting fingerprint feature data from the impairment data-suppressed captured image.

3. The method of claim 2, wherein the processing of the captured at least one image of a fingerprint comprises:
    subtracting the impairment data of the stored captured image from the captured at least one image of a fingerprint.

4. The method of claim 1, wherein the capturing of at least one image of a fingerprint comprises:
    capturing a plurality of images of the user's finger, the images comprising impairment data caused by impairments that the fingerprint sensor is subjected to; and
    creating, from the plurality of captured images of the fingerprint, a new image comprising the impairment data, which new image replaces the previously stored image comprising impairment data,
    wherein the acquiring of a stored image comprising impairment data caused by impairments that the fingerprint sensor is subjected to comprises:
        acquiring the created new image comprising the impairment data.

5. The method of claim 1, wherein the stored image comprising impairment data caused by impairments that the fingerprint sensor is subjected to is being captured with a rubber stamp device contacting the fingerprint sensor.

6. The method of claim 1,
    wherein, if there is a match between the extracted fingerprint feature data and the enrolled authorised fingerprint feature data, the user is authenticated.

7. The method of claim 6, wherein the enrolled authorised fingerprint feature has been processed with the stored image comprising impairment data in order to at least partly suppress any impairment data present in the enrolled authorised fingerprint feature data.

8. A fingerprint sensing system configured to enable authentication of a user based on fingerprint data captured by a fingerprint sensor of the fingerprint sensing system with an authentication process,
    the fingerprint sensor being configured to:
        capture at least one image of a fingerprint of a user's finger contacting the fingerprint sensor; the fingerprint sensing system further comprising:
    a processor unit being configured to:
        acquire a stored image comprising impairment data caused by impairments that the fingerprint sensor is subjected to;
        extract fingerprint feature data from the captured at least one image;
        extract impairment feature data from the acquired image; and
        compare at least a subset of the extracted fingerprint feature data to at least a subset of the extracted impairment feature data of the acquired image, and
        wherein: (i) if there is a match the authentication process is terminated and the user is not authenticated, and (ii) if there is no match the extracted fingerprint feature data is compared with enrolled authorised fingerprint feature data to determine authentication of the user.

9. The fingerprint sensing system of claim 8, the processor unit further being configured to:
process the captured at least one image of a fingerprint with the stored image comprising impairment data in order to at least partly suppress the impairment data in the captured at least one image of a fingerprint, thereby resulting in an impairment data-suppressed captured image,
wherein the extracting of fingerprint feature data from the captured at least one image comprises:
extract fingerprint feature data from the impairment data-suppressed captured image.

10. The fingerprint sensing system of claim 9, the processor unit further being configured to, when processing the captured at least one image of a fingerprint:
subtract the impairment data of the stored captured image from the captured at least one image of a fingerprint.

11. The fingerprint sensing system of claim 8, wherein the fingerprint sensor is configured to:
capture a plurality of images of the user's finger, the images comprising impairment data caused by impairments that the fingerprint sensor is subjected to;
the processor unit further being configured to:
create, from the plurality of captured images of the fingerprint, a new image comprising the impairment data, which new image replaces the previously stored image comprising impairment data, and further to, when acquiring a stored image comprising impairment data caused by impairments that the fingerprint sensor is subjected to comprises:
acquire the created new image comprising the impairment data.

12. The fingerprint sensing system of claim 8, wherein the stored image comprising impairment data caused by impairments that the fingerprint sensor is subjected to is being captured with a rubber stamp device contacting the fingerprint sensor.

13. The fingerprint sensing system of claim 8,
wherein, if there is a match between the extracted fingerprint feature data and the enrolled authorised fingerprint feature data, the user is authenticated.

14. The fingerprint sensing system of claim 13, wherein the enrolled authorised fingerprint feature has been processed with the stored image comprising impairment data in order to at least partly suppress any impairment data present in the enrolled authorised fingerprint feature data.

15. An electronic device comprising the fingerprint sensing system of claim 8.

16. A computer program product comprising a non-transitory computer readable medium, the computer readable medium having a computer program embodied thereon, the computer program comprising computer-executable instructions for causing a fingerprint sensing system to perform the method of claim 1 when the computer-executable instructions are executed on a processing unit included in the fingerprint sensing system.

* * * * *